(12) United States Patent
Smith et al.

(10) Patent No.: US 11,403,831 B1
(45) Date of Patent: Aug. 2, 2022

(54) EFFICIENT COLOR THEMING OF BACKGROUND IMAGES IN WEB-BASED MIXED REALITY ENVIRONMENTS

(71) Applicant: Microsoft Technology Licensing, LLC, Redmond, WA (US)

(72) Inventors: Michael Lee Smith, Kirkland, WA (US); Spencer John Kopach, Everett, WA (US); Amy Lynn Scarfone, Missoula, MT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/149,143

(22) Filed: Jan. 14, 2021

(51) Int. Cl.
*G06T 19/20* (2011.01)
*G06T 15/04* (2011.01)
*G06T 19/00* (2011.01)
*H04L 67/10* (2022.01)

(52) U.S. Cl.
CPC ........... *G06T 19/20* (2013.01); *G06T 15/04* (2013.01); *G06T 19/006* (2013.01); *G06T 2200/24* (2013.01); *G06T 2219/2012* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,652,897 B2 | 5/2017 | Osborn et al. | |
| 9,805,510 B2 | 10/2017 | Siddiqui et al. | |
| 10,325,407 B2 | 6/2019 | Lanier et al. | |
| 10,607,567 B1* | 3/2020 | Schritter | G09G 5/026 |
| 10,803,671 B2 | 10/2020 | Scarfone et al. | |

(Continued)

OTHER PUBLICATIONS

Adobe Substance Forum, "Difference between Base Color, Albedo and Diffuse", 2016, retrieved from "https://forum.substance3d.com/index.php?topic=9205.0" Accessed Sep. 28, 2021 (Year: 2016).*

(Continued)

*Primary Examiner* — Michael J Cobb
(74) *Attorney, Agent, or Firm* — NovoTechIP International PLLC

(57) ABSTRACT

A data processing system for end-to-end configuration assistance for presenting a mixed reality environment implements sending a request to a mixed reality service for environment attribute information for a mixed reality environment, the environment attribute information including attributes of mixed reality environment for displaying the mixed reality service; receiving the environment attribute information from the mixed reality service; retrieving a grayscale background image from the mixed reality service identified in the environment attribute information; applying the grayscale background image as a texture to a background object in the mixed reality environment; determining a background color to be applied to the background object based on the environment attribute information; applying the background color to the background object to create a color background for the mixed reality environment; and displaying the mixed reality environment on a display of the data processing system.

17 Claims, 12 Drawing Sheets
(4 of 12 Drawing Sheet(s) Filed in Color)

(56) References Cited

U.S. PATENT DOCUMENTS

| | | | |
|---|---|---|---|
| 2013/0278600 A1* | 10/2013 | Christensen | G06T 19/20 |
| | | | 345/420 |
| 2019/0147658 A1 | 5/2019 | Kurabayashi | |
| 2019/0156526 A1* | 5/2019 | Liu | G06T 7/0012 |
| 2019/0295323 A1* | 9/2019 | Gutierrez | G02B 27/017 |
| 2020/0004225 A1* | 1/2020 | Buller | B33Y 50/02 |
| 2020/0082595 A1* | 3/2020 | Okada | G06T 15/80 |
| 2021/0056743 A1* | 2/2021 | Lee | G06K 9/00362 |
| 2021/0398337 A1* | 12/2021 | McDuff | G06V 20/46 |

OTHER PUBLICATIONS

Iri Shinsoj, "PBR, Color Space Conversion and Albedo Chart", 2018, ArtStation, retrieved from "https://www.artstation.com/blogs/shinsoj/Q9j6/albedo-chart", Accessed Sep. 28, 2021 (Year: 2018).*

MyNasa Data, "Changing Albedo Values", 2021, NASA, retrieved from "https://mynasadata.larc.nasa.gov/basic-page/changing-albedo-values", Accessed Sep. 28, 2021 (Year: 2021).*

Evans, et al., "Evaluating the Microsoft HoloLens through an Augmented reality Assembly Application", In Proceedings of SPIE Degraded Environments: Sensing, Processing, and Display, May 5, 2017, 19 Pages.

Guimonei, Patrick, "How to Use SharePoint Spaces and Microsoft 365 to Jump on the VR Trend", Retrieved From: https://www.avepoint.com/blog/sharepoint-hybrid/sharepoint-spaces-microsoft-365/, Sep. 30, 2020, 11 Pages.

Park, Yoon, "MRTK 101 / FAQ: How to use Mixed Reality Toolkit Unity for Basic Interactions (HoloLens 2, HoloLens, Windows Mixed Reality, Open VR)", Retrieved From: https://medium.com/@dongyoonpark/mrtk-101-faq-how-to-use-mixed-reality-toolkit-unity-for-basic-interactions-hololens-2-88dbcb9758f9, Aug. 22, 2019, 17 Pages.

* cited by examiner

Mixed Reality Environment Attributes

Selected Background: Mountains Background —510

(1) Background – Top —515
- Texture URL: ../content/mountains-bkgrd-top.png —520
- Color – Albedo: color001 —525

(2) Background – Bottom
- Texture URL: ../content/mountains-bkgrd-bot.png
- Color – Albedo: color001

(3) Background – Back
- Texture URL: ../content/mountains-bkgrd-back.png
- Color – Albedo: color001

(4) Background – Left
- Texture URL: ../content/mountains-bkgrd-left.png
- Color – Albedo: color001

(5) Background – Front
- Texture URL: ../content/mountains-bkgrd-front.png
- Color – Albedo: color001

(6) Background – Right
- Texture URL: ../content/mountains-bkgrd-right.png
- Color – Albedo: color001

FIG. 5

EFFICIENT COLOR THEMING OF BACKGROUND IMAGES IN WEB-BASED MIXED REALITY ENVIRONMENTS

BACKGROUND

Mixed reality combines computer processing, human input, and environmental inputs to provide an experience that blends the physical and digital worlds. Mixed reality encompasses a spectrum of technologies that span the divide between these worlds. Mixed reality environments can provide an immersive platform for sharing two-dimensional (2D) and/or three-dimensional (3D) content with users over the Internet. Mixed reality environments may be used by a corporation or other entity to provide an interactive environment for sharing and generating content internally and/or externally. For instance, a corporation may use such a mixed reality environment internally as a platform for sharing and developing content with members of a project team that permits the members of the team to access, create, and/or modify mixed reality content. Mixed reality may be used to create interactive content that customers or clients of a business may interact with to learn more about the products and/or services that are provided by the business of the corporation.

Various elements of the mixed-reality environment may be customizable to suit the needs of the provider of the mixed reality environment, such as but not limited to the background color and/or background imagery of the mixed reality environment. Multiple copies of the mixed-reality environment elements are typically created to represent each of the permutations of the customizable element. However, this approach consumes a significant amount of computing, network, and memory resources. Hence, there is a need for improved systems and methods that provide a technical solution for efficiently providing color theming for web-based mixed reality environments.

SUMMARY

An example data processing system according to the disclosure may include a processor and a computer-readable medium storing executable instructions. The instructions when executed cause the processor to perform operations including sending a request to a mixed reality service for environment attribute information for a mixed reality environment, the environment attribute information includes attributes of mixed reality environment for displaying the mixed reality service; receiving the environment attribute information from the mixed reality service; obtaining, from the mixed reality service, a grayscale background image identified in the environment attribute information; applying the grayscale background image as a texture to a background object in the mixed reality environment; determining a background color to be applied to the background object based on the environment attribute information; applying the background color to the background object to create a color background for the mixed reality environment; and displaying the mixed reality environment on a display of the data processing system.

An example method implemented in a data processing system for presenting a mixed reality environment on a display of the data processing system includes sending a request to a mixed reality service for environment attribute information for a mixed reality environment, the environment attribute information includes attributes of mixed reality environment for displaying the mixed reality service; receiving the environment attribute information from the mixed reality service; obtaining, from the mixed reality service, a grayscale background image identified in the environment attribute information; applying the grayscale background image as a texture to a background object in the mixed reality environment; determining a background color to be applied to the background object as a texture based on the environment attribute information; applying the background color to the background object to create a color background for the mixed reality environment; and displaying the mixed reality environment on a display of the data processing system.

An example computer-readable storage medium stored instructions, that when executed, cause a processor of a programmable device to perform functions of sending a request to a mixed reality service for environment attribute information for a mixed reality environment, the environment attribute information includes attributes of mixed reality environment for displaying the mixed reality service; receiving the environment attribute information from the mixed reality service; obtaining, from the mixed reality service, a grayscale background image identified in the environment attribute information; applying the grayscale background image as a texture to a background object in the mixed reality environment; determining a background color to be applied to the background object based on the environment attribute information; applying the background color to the background object to create a color background for the mixed reality environment; and displaying the mixed reality environment on a display of the data processing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 shows an example of environment attribute information that may be used with examples shown in FIGS. 4A-4C.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for efficient color theming of background images in web-based mixed reality environments presented herein provide a technical solution to the problem of efficiently customizing elements of such mixed reality environments. The background of a mixed-reality environment is typically generated by applying a background image to a skybox. The skybox is a cube that encompasses the entire scene, and the background image is mapped to the faces of this cube. The background image and image color may be customized in many mixed reality environments. To support this feature in current systems, multiple versions of the background image are typically generated in each of the background colors to be supported and are provided to the client device that will render the mixed reality environment. The techniques presented herein instead provide a single greyscale image of the background image to the client device and the client device is configured to dynamically apply the background color to the background image by setting a base color map value (also referred to herein as the "albedo"). This approach can significantly reduce computing, network, and/or memory resources utilized to provide efficient color theming of background images in web-based mixed reality environments. These and other technical benefits of the techniques disclosed herein will be evident from the discussion of the example implementations that follow.

Figure 1:
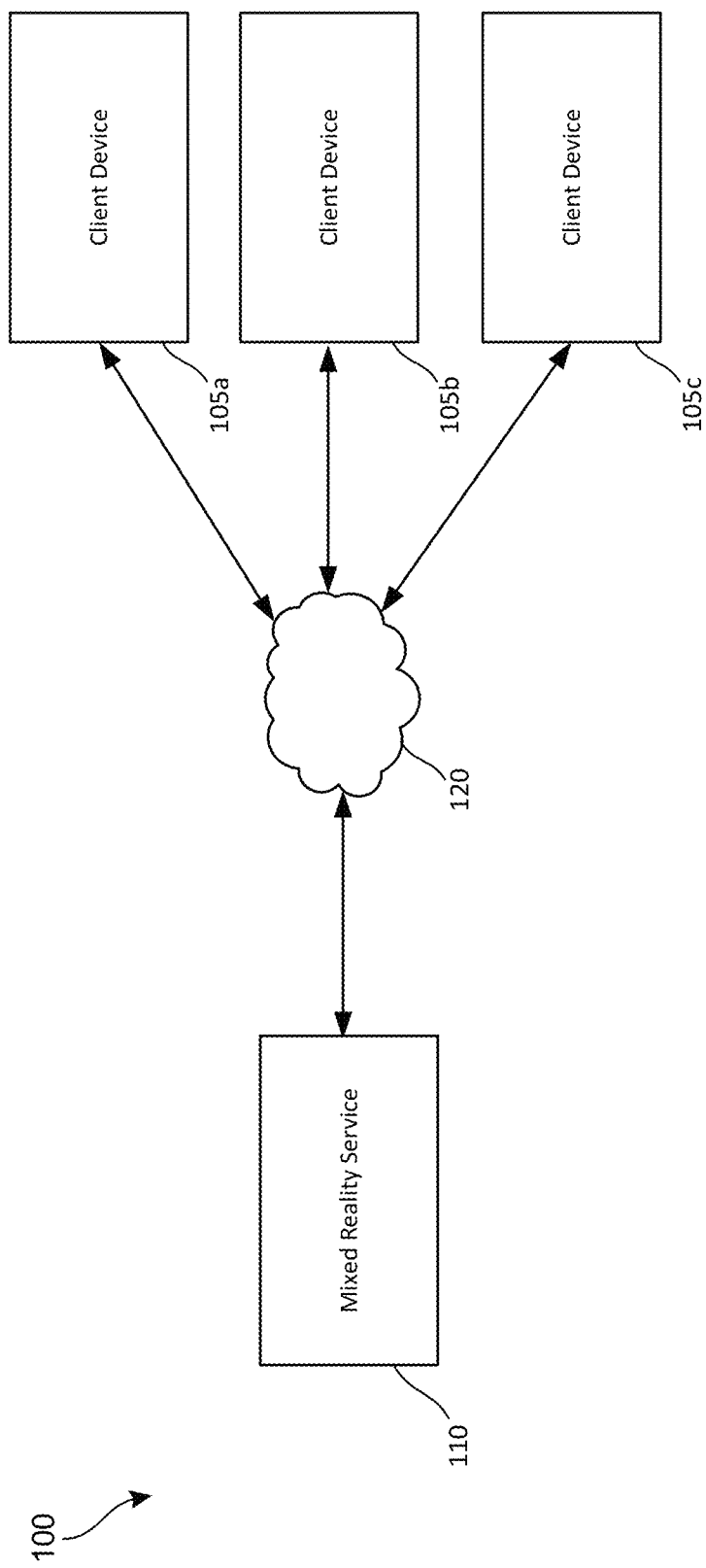
FIG. 1 is a diagram showing an example computing environment in which the techniques provided herein for efficient color theming of background images in web-based mixed reality environments may be implemented.

FIG. 1 is a diagram showing an example computing environment 100 in which the techniques provided herein for efficient color theming of background images in web-based mixed reality environments may be implemented. The computing environment 100 may include cloud services 125a, 125b, and 125c. The example computing environment 100 may include client devices 105a, 105b, and 105c and a mixed reality service 110. The client devices 105a, 105b, and 105c may communicate with the mixed reality service 110 via the network 120. The network 120 may be implemented at one or more public or private networks and may be implemented at least in part by the Internet.

Figure 3A:
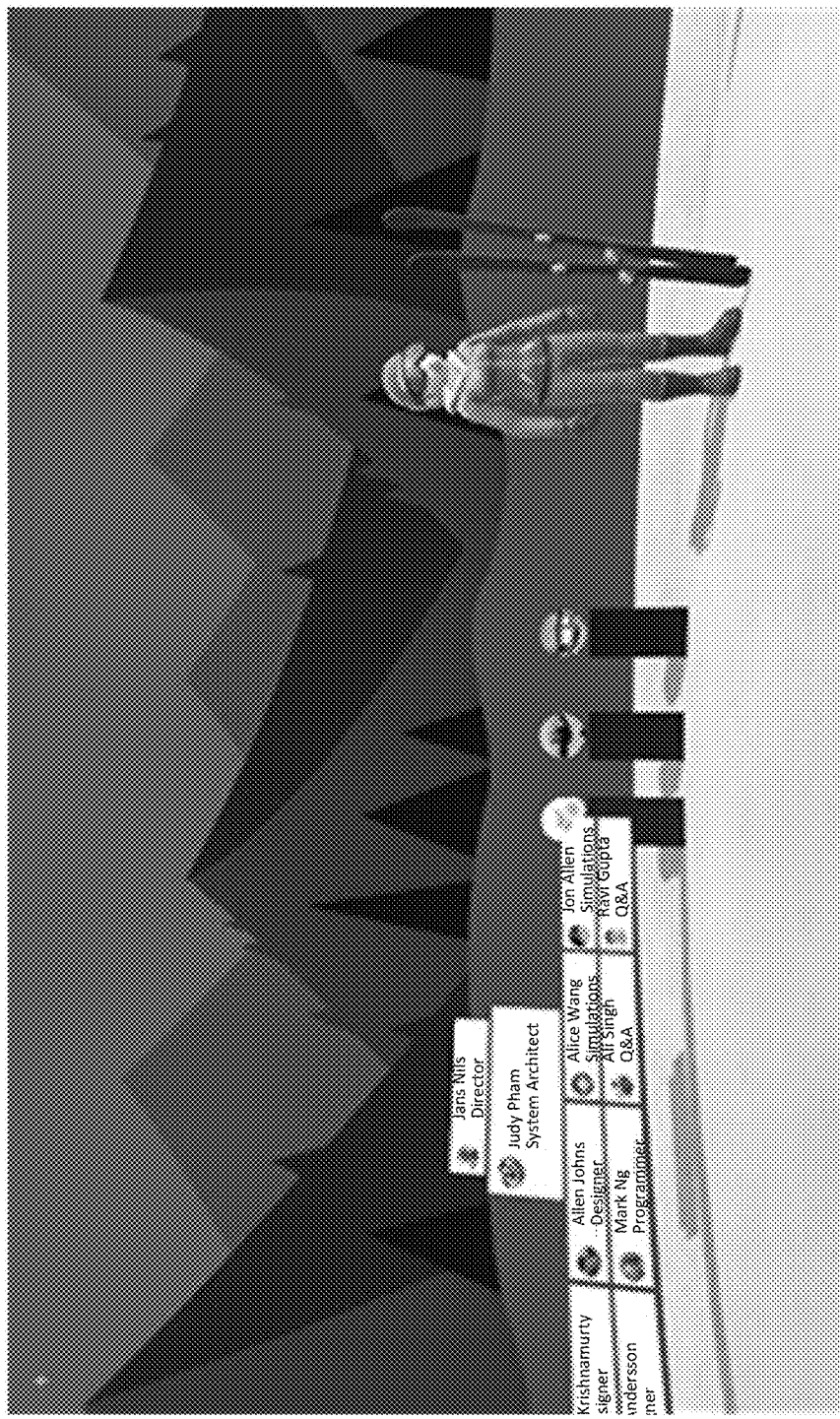
FIG. 3A is an image of a view of an example mixed-reality environment.

The mixed reality service 110 may provide one or more web-accessible mixed reality environments. The mixed reality service 110 may be configured to provide tools for creating new mixed reality environments, configuring mixed reality environments, and publishing mixed reality environments. A user may access one of the mixed reality environments from a web browser of a client device, such as the client devices 105a, 105b, and 105c. A mixed-reality environment provides a web-accessible simulated environment that includes 2D and/or 3D objects with which a user may interact via a browser of the client device. The mixed-reality environment may be viewable in 2D and/or 3D depending on the display capabilities of the client device. FIG. 3A is an image of a view 305 of an example mixed-reality environment that may be displayed in a browser of the client device. Furthermore, the user may interact with the mixed-reality environment using various control means associated with the client device, including but not limited to wireless handheld controllers, a mouse, a touchscreen, a joystick, a game controller, a keyboard, and/or other input devices.

The mixed reality service 110 may be configured to provide mixed reality environments that are configured to serve as web-based portal for creating, accessing, modifying, and/or sharing 2D and/or 3D content. The mixed-reality environment may include objects representing the 2D and/or 3D content that are disposed within the three-dimensional environment of the mixed-reality environment. The content items may include but are not limited to documents, images, videos, spreadsheets, graphs, charts, three-dimensional models of objects, and/or other content that may be created, accessed, modified, and/or shared with users who are permitted to access the mixed reality environment. The mixed reality service 110 may also provide other services, such as but not limited to a word processing application, a file collaboration platform, a communications platform, a presentation design application, an email application or email service, a note taking application, and/or other cloud-based applications or services that allow the user to consume, create, share, collaborate on, and/or modify content. In some implementations, these additional services may be implemented by one or more application services that are separate from the mixed reality service 110, and the mixed reality service 110 may provide a user interface for interacting with the one or more application services.

The client devices 105a, 105b, and 105c each is a computing device that may be implemented as a portable electronic device, such as a mobile phone, a tablet computer, a laptop computer, a portable digital assistant device, a portable game console, and/or other such devices. The client devices 105a, 105b, and 105c may also be implemented in computing devices having other form factors, such as a desktop computer, vehicle onboard computing system, a kiosk, a point-of-sale system, a video game console, and/or other types of computing devices. The client devices 105a, 105b, and 105c may provide 2D and/or 3D display capabilities. A client device may include a headset or other display device for displaying the mixed reality environment in 3D. While the example implementation shown in FIG. 1 includes three client devices, other implementations may include a different number of client devices. The client devices 105a, 105b, and 105c may be used to access the mixed reality environment or environments provided by the mixed reality service 110.

Figure 2:
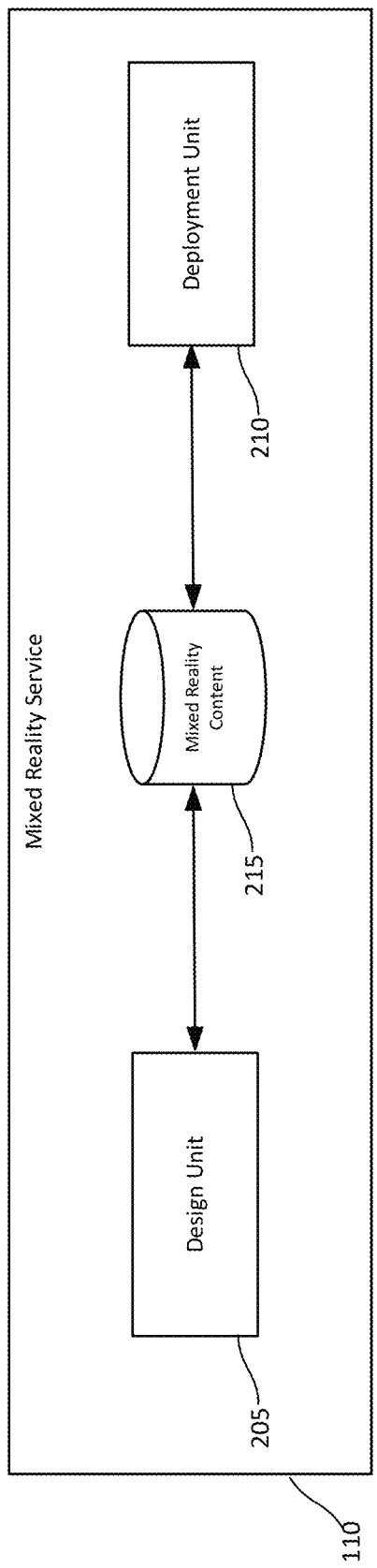
FIG. 2 is an example architecture that may be used, at least in part, to implement the mixed reality service shown in FIG. 1.

FIG. 2 is a diagram of an example architecture that may be used, at least in part, to implement the mixed reality service 110 shown in FIG. 1. The mixed reality service 110 may include a design unit 205 and a deployment unit 210. The mixed reality service 110 may also include a mixed reality content datastore 215 for storing content associated with the one or more mixed-reality environments created and/or maintained using the mixed reality service 110.

The design unit 205 may be configured to provide a user interface that enables a user to create a new customizable mixed reality environment that may be customized using the deployment unit 210. The design unit 205 may be used by a provider of the mixed reality service to create one or more customizable mixed reality environments. The customizable mixed reality environments may be used as a template by customers of the mixed reality service 110 to create customized mixed reality environments suited to the needs of the customers.

The design unit 205 may provide a user interface that allows a user to specify which features of the customizable user interface may be customized. The user interface of the design unit 205 may provide means for selecting a set of background images that may be included with the customizable mixed reality environment. A customer of the mixed reality service 110 may select from these backgrounds to customize an instance of the mixed reality environment. The background images may be greyscale images that may be dynamically colorized at a client device consuming the mixed reality environment using the techniques provided herein. A background image may be applied to a skybox or other background object in the mixed reality environment on which the image may be applied, and the background may be colorized by applying a color to the skybox or other background object by setting an albedo color value of the skybox or other background object. The color of the background may be dynamically changed by changing the albedo color value of the skybox or other background object without requiring a background image for each background color. This approach may significantly reduce the number of images downloaded by the client device at the time that the mixed reality environment is loaded and rendered on the client device.

Figure 3B:
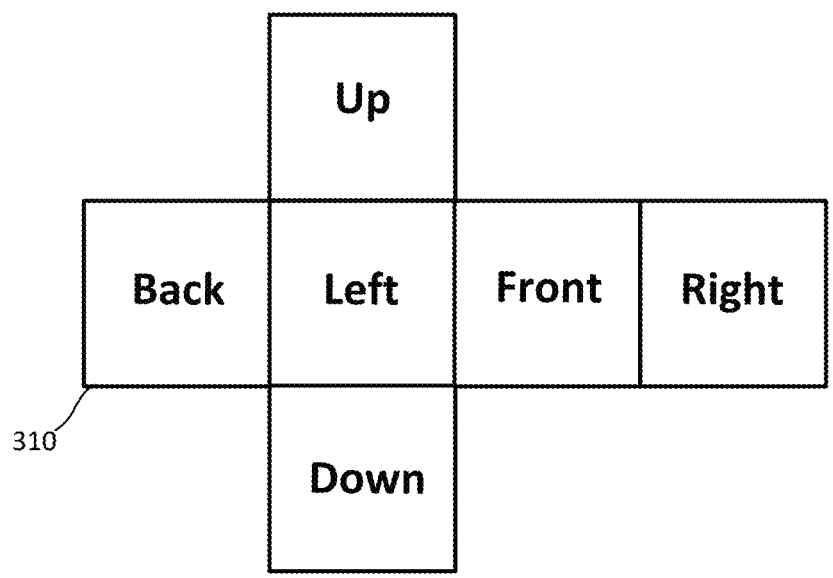
FIG. 3B is an example of how a background image may be segmented.
Figure 3C:
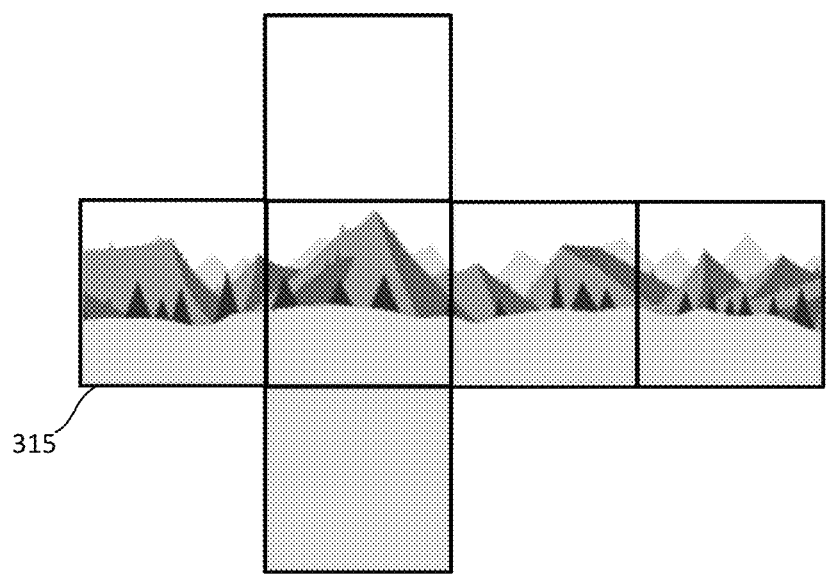
FIG. 3C is an example of the segmentation of an example background image.

The design unit 205 may be configured to segment each background image into multiple segments and each segment may be applied to a face of the skybox or the other background object upon which the background image is to be applied. The background images may also be segmented prior to be added to the customizable mixed reality environment. FIG. 3B is a diagram of an example layout 310 showing how the segments of a background image may be oriented for a skybox. FIG. 3C shows an example background image 315 which has been segmented according to the layout 310.

The design unit 205 may also provide a user interface for creating themes that may be applied to the mixed reality environment. Each theme may include a color scheme, user interface style, and/or other attributes that may be applied to the mixed reality environment. The themes may be used to apply color to the background and/or other elements of the mixed reality environment.

The user interface of the design unit 205 may also provide means for selecting 2D and/or 3D objects that may be added to the customizable mixed reality environment. The provider of the mixed reality service 110 may add one or more of the 2D and/or 3D objects to the customizable environment. The user interface of the design unit 205 may be configured to allow the provider of the customizable mixed reality environment to select a set of 2D and/or 3D objects that a customer may select from to be added to the mixed reality environment when customizing mixed reality environment.

The user may select default settings for the mixed reality environment that may be customized by customers using the customizable mixed reality environment to create a customized mixed reality environment that may be published for other users to access. The content associated with the customizable mixed reality environments may be stored in the mixed reality content datastore 215.

The deployment unit 210 may be configured to allow a user to customize a customizable mixed reality environment created using the design unit 205. The user may be an administrator of a group, team, company, or other organization that customizes a mixed reality environment for members of the group, team, company, or other organization to access, create, modify, and/or share content via the mixed reality environment. In other implementations, the user may customize the mixed reality environment that may be publicly accessible, and the mixed reality environment may be configured to access, create, and/or modify mixed reality content. The group, team, company, or other organization customizing the mixed reality environment may obtain a license from the mixed reality service 110 for the services provided by the mixed reality service 110.

Figure 4A:
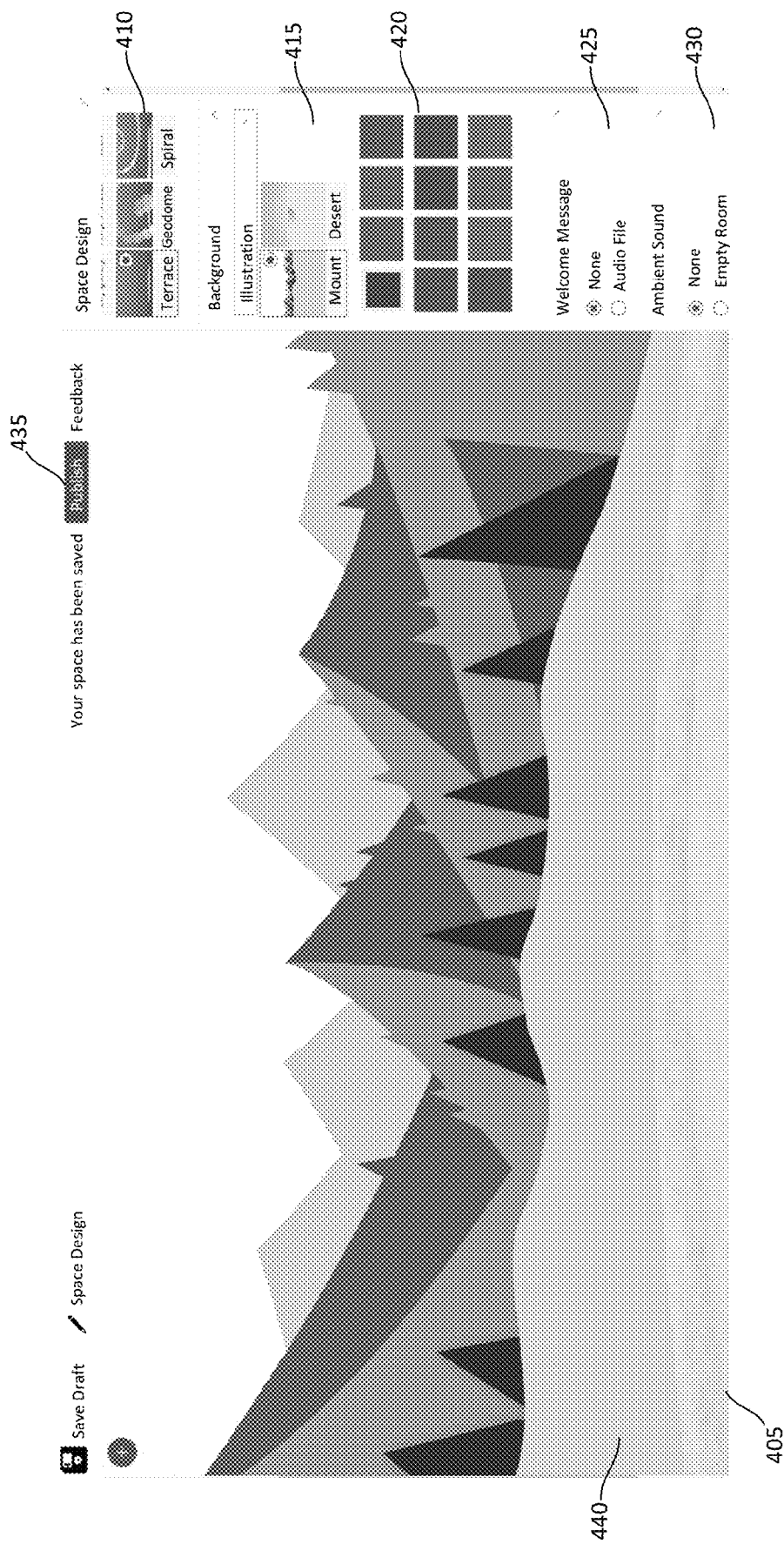
FIG. 4A shows an example user interface that may be provided by the deployment unit shown in FIG. 2.
Figure 4B:
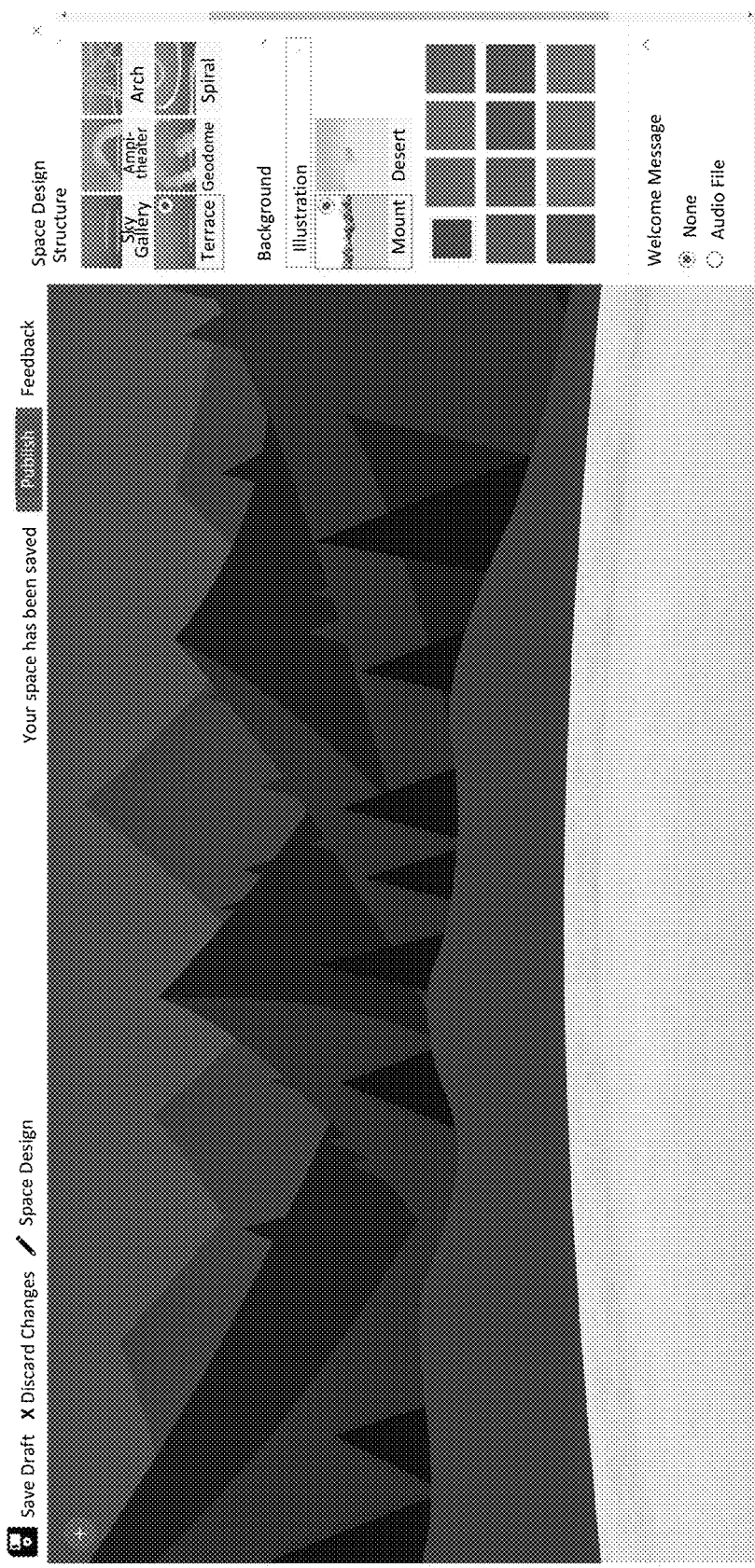
FIGS. 4B and 4C show examples of the user interface in which a color has been selected and applied to colorize the greyscale background image shown in FIG. 4A.
Figure 4C:
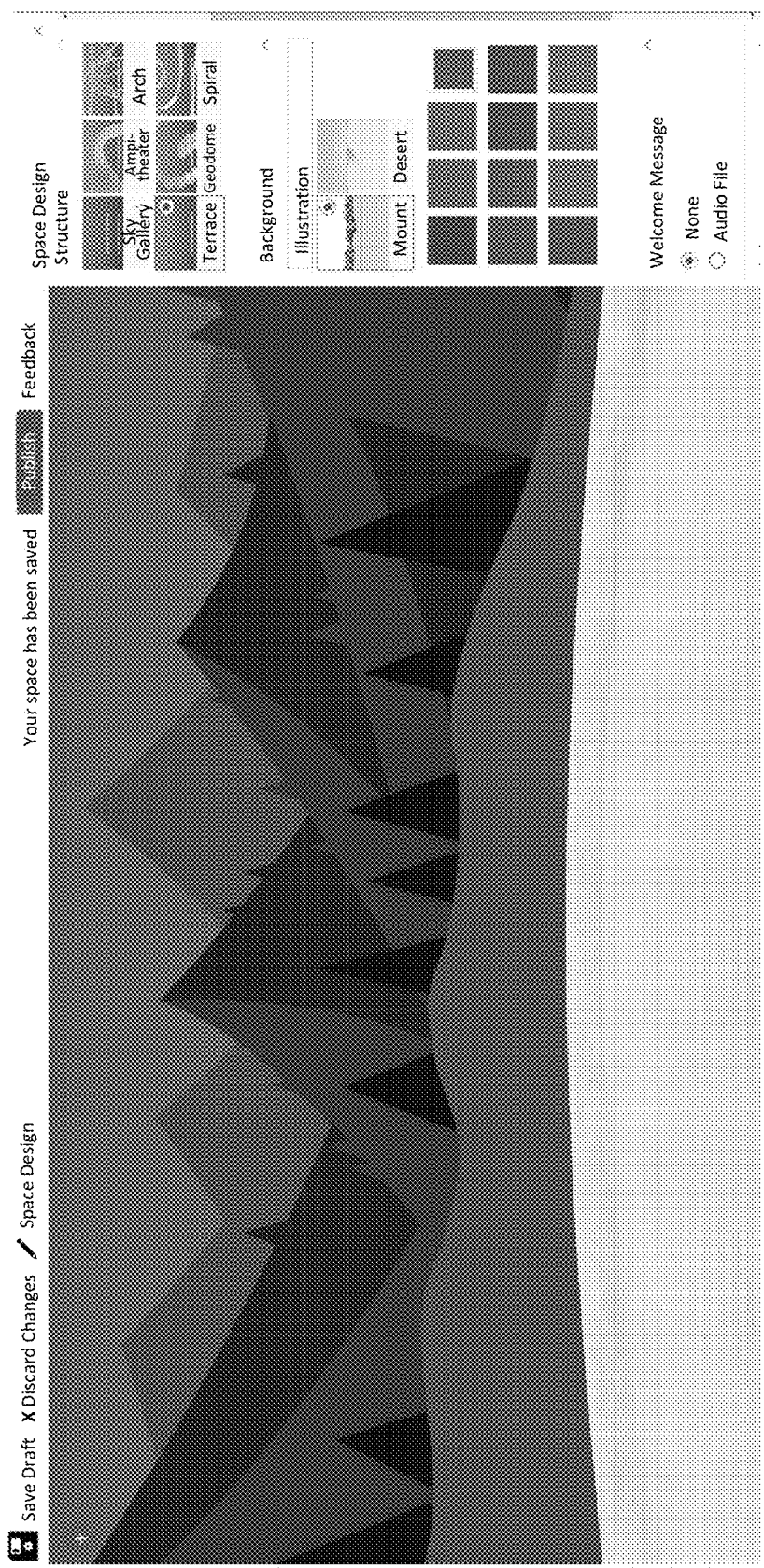

The deployment unit 210 may provide a user interface, such as the example user interface shown in FIGS. 4A-4C. FIG. 4A shows an example user interface 405 that may be provided by the deployment unit 210. The user interface 405 may be accessed by the user from a browser of a client device, such as the client devices 105a, 105b, and 105c shown in FIG. 1. The user interface 405 may include controls for customizing various aspects of the mixed reality environment. The user interface 405 provides a view 440 of the mixed reality environment to be customized. In this example, a default configuration of the mixed reality environment is shown in which the black and white background image has been applied as a texture to the skybox representing the background of the mixed reality environment.

The user interface 405 includes space design controls 410, background image selection controls 415, background color controls 420, welcome message controls 425, ambient sound controls 430, and a publish environment control 435. The space design controls 410 provide means for selecting a shape of a base upon which elements of the mixed reality environment may be placed. The background image selection controls 415 provide means for selecting a background image. The background images may be segmented greyscale images as shown in FIGS. 3B-3C. The deployment unit 210 may be configured to segment the background image where the background image has not been segmented. The segmented greyscale image may be applied as a texture to the faces of the skybox.

The background color controls 420 provide means for dynamically applying a background color to the greyscale background image, as shown in FIGS. 4B and 4C. Instead of directly applying color the background image, the selected background color is applied to the skybox or other background object at the client device to provide a colorized background for the mixed reality environment. The techniques for applying the color the grayscale image by setting an albedo value of the skybox or other background object on which the background image is applied are described in detail in the examples which follow.

The welcome message controls 425 provide means for providing textual, video, and/or audio content that may be presented to a user accessing the mixed reality environment being customized once the mixed reality environment has been published to make the mixed reality environment available to other users. The ambient sound controls 430 provide means for adding a background sound or sounds that may be played as a user interacts with the mixed reality environment once the environment has been published. The publish environment controls 410 provide means for publishing the mixed reality environment to make the environment available to other users to interact with the mixed reality environment. The publish environment controls 410 may provide means for configuring a Universal Resource Identifier (URL) or other type of link or network reference for accessing the published mixed reality environment.

The deployment unit 210 may store environment attribute information for the mixed reality environment. FIG. 5 shows an example of environment attribute information 505 for the examples shown in FIGS. 4A-4C. The scene attributes may include information 510 for the background selected for the mixed reality environment. The background information 510 may include information for each of the faces of the skybox identifying a segment of the grayscale background image to be applied to that face of the skybox. The background information for each face may include a URL reference the segment of the background image and color mapping information for the color to be applied to the image segment. The color mapping information may include an albedo parameter which represents a raw color without lighting information to be applied to the face of the segment. The color to be applied to each of the faces of the skybox are typically the same color value.

In the example shown in FIG. 5, the background information 510 indicates that the "Mountains Background" has been applied to the mixed reality environment. The top segment of the skybox 515 includes the URL 520 providing a location to the image file for that segment and an albedo color 525 to be applied to the face of the skybox to cause the background to appear as the correct color.

A technical benefit of this approach is that multiple colors of a background may be generated for a mixed reality environment by setting albedo value for the segments by applying the color to a greyscale background image by setting the albedo color to be applied to each of the faces of the skybox to which the greyscale image is to be provided. A single background image may be created and downloaded by the client device that is going to render the mixed reality environment only needs to download a single greyscale image for the background and apply the background color to the image. As a result, the amount of computing, network, and memory resources consumed by the browser to render the mixed reality environment may be significantly reduced. Furthermore, the background color may be dynamically changed at the client device on which a mixed reality environment is being customized or on which a published mixed reality environment is being interacted with by the user.

Figure 6:
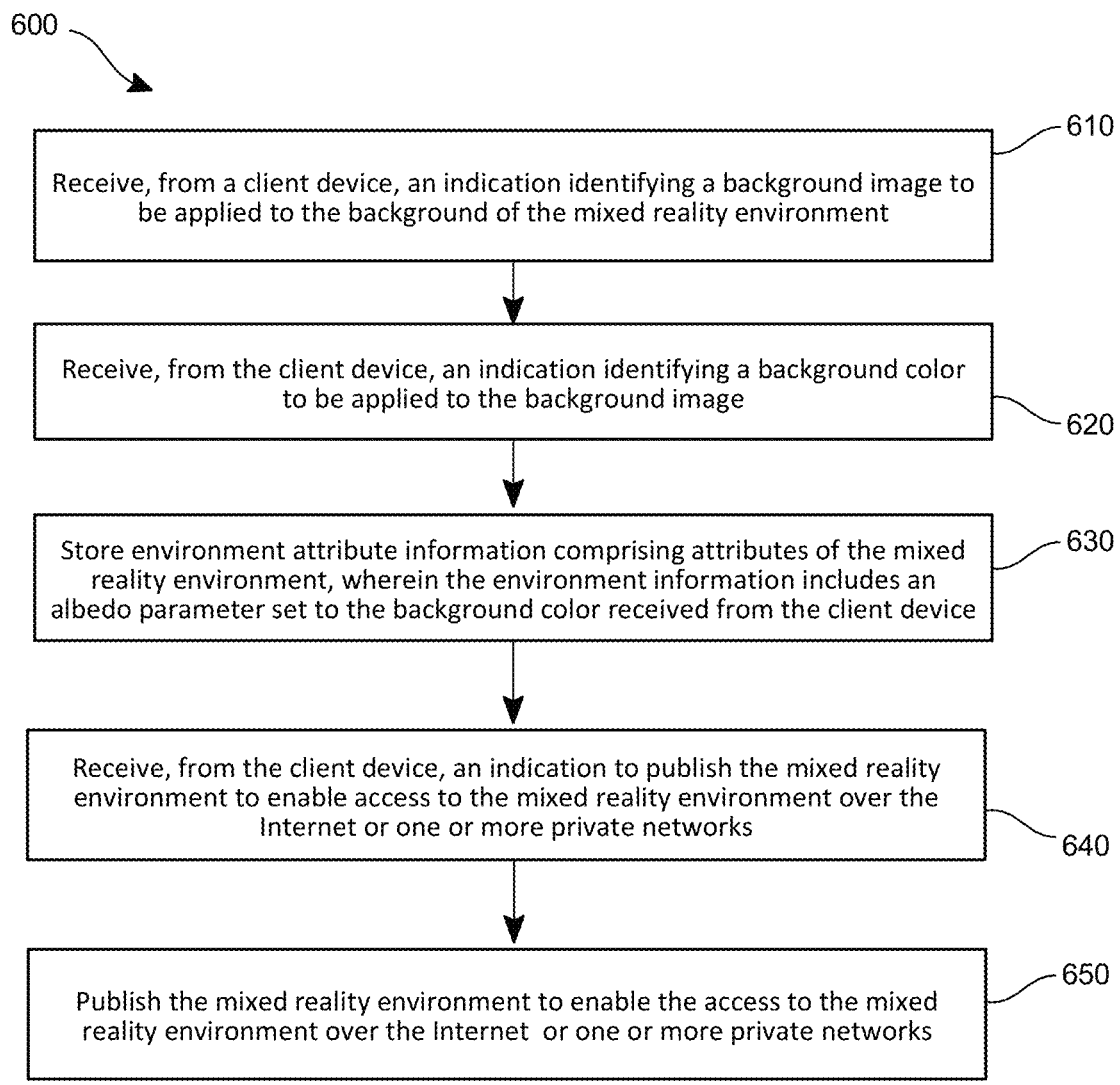
FIG. 6 is a flow diagram of an example process for customizing a mixed reality environment.

FIG. 6 is a flow diagram of an example process 600 for customizing a mixed reality environment. The process 600 may be implemented by the deployment unit 210 of the mixed reality service 110 shown in FIG. 2.

The processing 600 may include an operation 610 of receiving an indication identifying a background image to be applied to the background of a mixed reality environment. The input may be received from a client device, such as the client devices 105a, 105b, and 105c, shown in FIG. 1. The background image may be selected from a set of background images associated with a customizable mixed reality environment that may have been created using the design unit 205. The background image may be selected via the user interface 405 shown in FIGS. 4A-4C. As described in the preceding examples, the provider of the mixed reality service 110 may provide the customizable mixed reality environment, which may be customized by an administrator of a group, team, company, or other organization to customize the mixed reality environment for use by the group, team, company, or other organization or for public use by users outside of the group, team, company, or other organization. The customizable mixed reality environment may include a set of backgrounds defined selected by the designer of the mixed reality environment, and the user customizing the mixed reality environment may select a background from the set of backgrounds. The deployment unit 210 may permit the user to select a custom background image that was not included in the preselected set of images included with the customizable mixed reality environment. The deployment unit 210 may be configured to convert the selected image to a greyscale image and to segment the image as shown in the examples of FIGS. 3B and 3C.

The processing 600 may include an operation 620 of receiving an indication identifying a background color to be applied to the background image. As shown in the examples in FIGS. 4A-4C, the user may select from a list of predetermined colors. In other implementations, the user interface 405 may include a color picker tool that allows the user to highlight a color within the color picker tool to set the background color. The background color may be stored in the environment attribute information 505 shown in FIG. 5. The selected color may be represented as a hexadecimal value that represents the selected color in the RGB color model or as a hexadecimal triplet that represents the selected color as red, blue, and green components. The selected color may be represented using other color models in other implementations.

The process 600 may include an operation 630 of storing environment attribute information 505 comprising attributes of the mixed reality environment configured using the user interface 405. The environment attribute information 505 may include an albedo parameter to be applied to the skybox or other background object. The albedo parameter may be set to the background color received via the user interface 405. The environment attribute information 505 may include additional attributes of the mixed reality environment that were customized using the user interface 405.

The process 600 may include an operation 640 of receiving an indication to publish the mixed reality environment to enable access to the mixed reality environment over the Internet or over one or more private networks. As discussed in the preceding examples, the publish environment controls 410 of the user interface 405 provide means for publishing the mixed reality environment to make the environment available to other users to interact with the mixed reality environment.

The process 600 may include an operation 650 of publishing the mixed reality environment to enable the access to the mixed reality environment over the Internet or one or more private networks in response to receiving the indication. The mixed reality service 110 may update the environment attribute information 505 to indicate that the customized mixed reality environment may be accessed by users. Once the mixed reality environment has been published, users may access the mixed reality environment from their client device using the Universal Resource Identifier (URL) or other type of link or network reference associated with the mixed reality environment.

Figure 7:
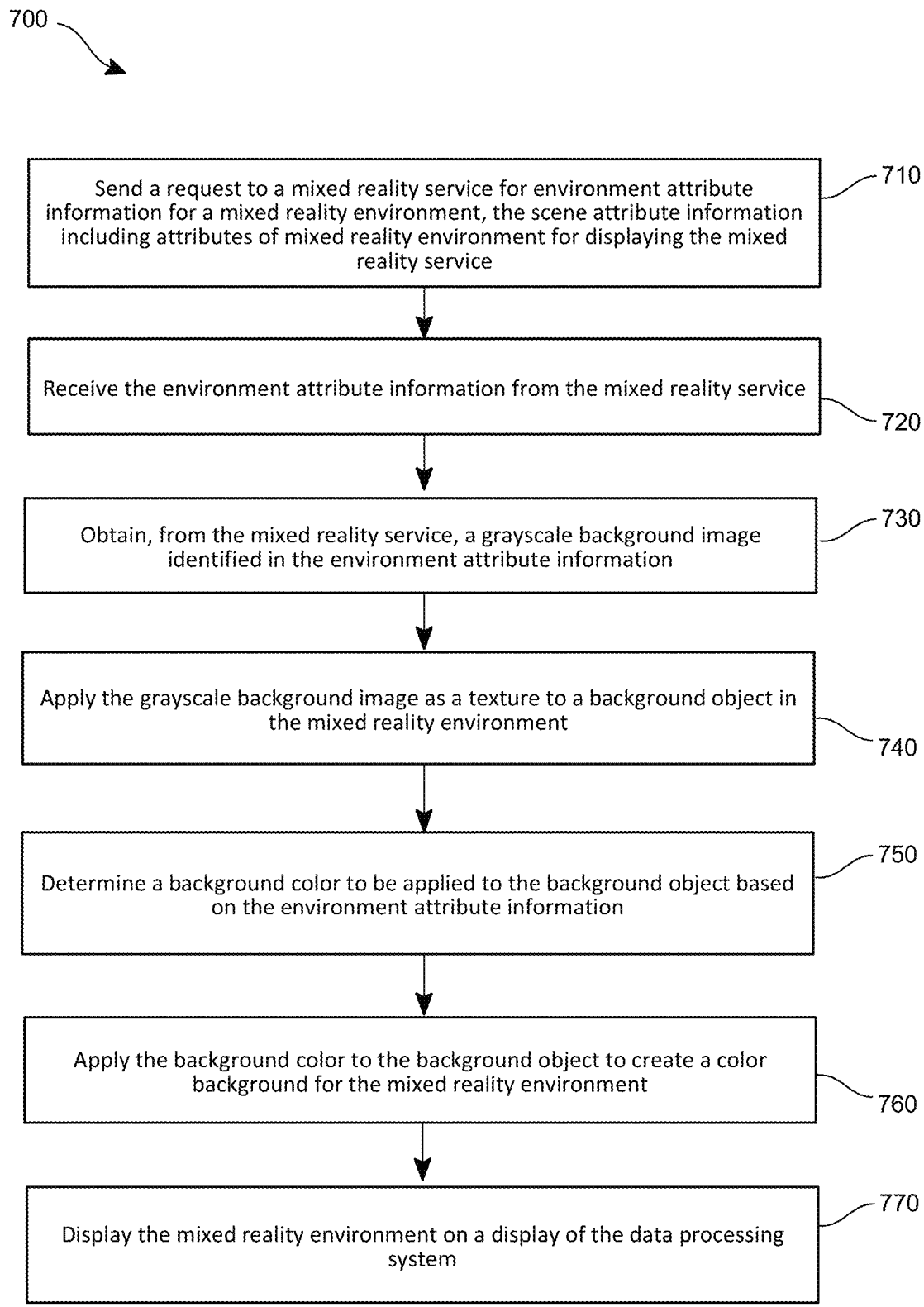
FIG. 7 is a flow diagram of an example process for presenting a mixed reality environment on a client device.

FIG. 7 is a flow diagram of an example process 700 for presenting a mixed reality environment on a client device. The process 700 may be implemented by the browser of a client device, such as the client devices 105a, 105b, and 105c shown in FIG. 1.

The process 700 may include an operation 710 of sending a request to a mixed reality service 110 for environment attribute information 505 for a mixed reality environment. The environment attribute information 505 includes attributes of mixed reality environment for displaying the mixed reality service on the client device. As discussed above, the environment attribute information 505 may include information identifying objects included in the mixed reality environment. The environment attribute information may also identify a greyscale image to be used as a background image to be applied to a background of the mixed reality environment and a color to be applied to the background.

The process 700 may include an operation 720 of receiving the environment attribute information 505 from the mixed reality service. The mixed reality service 110 may send the environment attribute information 505 associated with the mixed reality environment to the client device via the network 120.

The process 700 may include an operation 730 of obtaining, from the mixed reality service, a grayscale background image identified in the environment attribute information. The client device may request elements of the mixed reality environment from the mixed reality service 110. The elements may be identified in the environment attribute information 505 and may include the grayscale background to be applied to the background of the mixed reality environment. As discussed in the preceding examples, the background image may be segmented into multiple segments where each segment corresponds to a face of a skybox or other object upon which the background image is to be applied.

The process 700 may include an operation 740 of applying the grayscale background image as a texture to a background object in the mixed reality environment. The background image or image segments may be applied to the skybox or other object upon which the background image is to be applied as discussed in the preceding examples.

The browser of the client device may implement a 3D rendering engine to render the mixed reality environment. In some implementations, the browser may use the Babylon.js real time 3D engine that is implement by a JavaScript library for display 3D graphics in the web browser using HTML5. The 3D rendering engine may render the skybox or other object upon which the background image is to be applied and the textures and/or colors may then be applied to the skybox or other object.

The process 700 may include an operation 750 of determining a background color to be applied to the background object based on the environment attribute information. The background color may be included in the environment attribute information 505, as shown at least in FIG. 5.

The process 700 may include an operation 760 of applying the background color to the background object to create a color background for the mixed reality environment. As discussed in the preceding examples, the background color to be applied to the background may be defined in the environment attribute information 505. The background color may be applied to the skybox or other background object on which the greyscale image is applied. The background color may be set as an albedo parameter used to set a color of the image. The 3D rendering engine of the web browser of the client device applies the background color as the albedo color to the skybox or other object on which the greyscale image is applied as a texture. The background color may be dynamically updated by changing the albedo parameter value for the skybox or other background object. The mixed reality environment may provide a user interface element that allows the user to dynamically change the background value and/or other attributes of the mixed reality environment being interacted with through the browser of the client device.

The process 700 may include an operation 770 of displaying the mixed reality environment on a display of the data processing system. The mixed reality environment may be displayed in a browser of the client device, and a user of the client device may interact with the mixed reality environment via the input devices associated with the client device.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
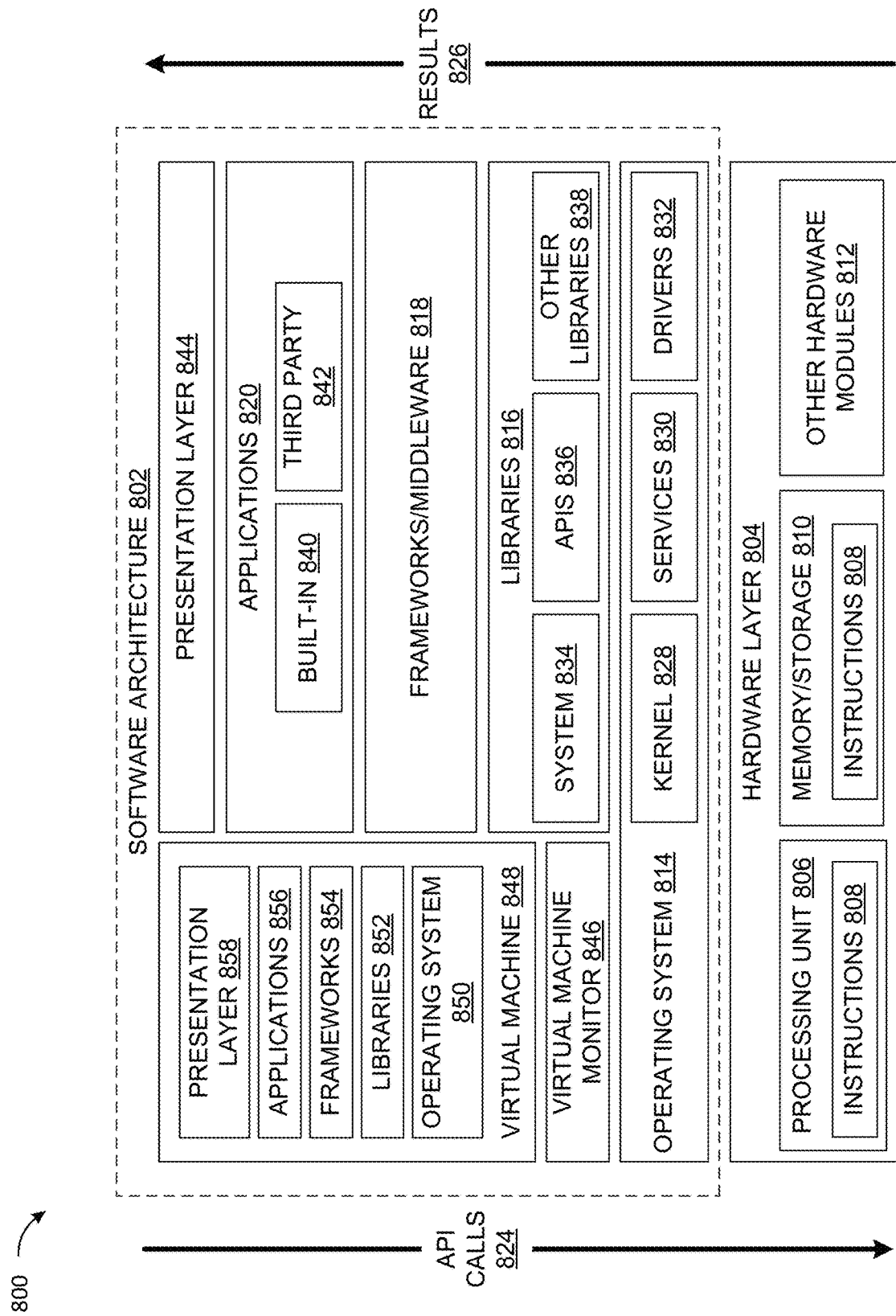
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
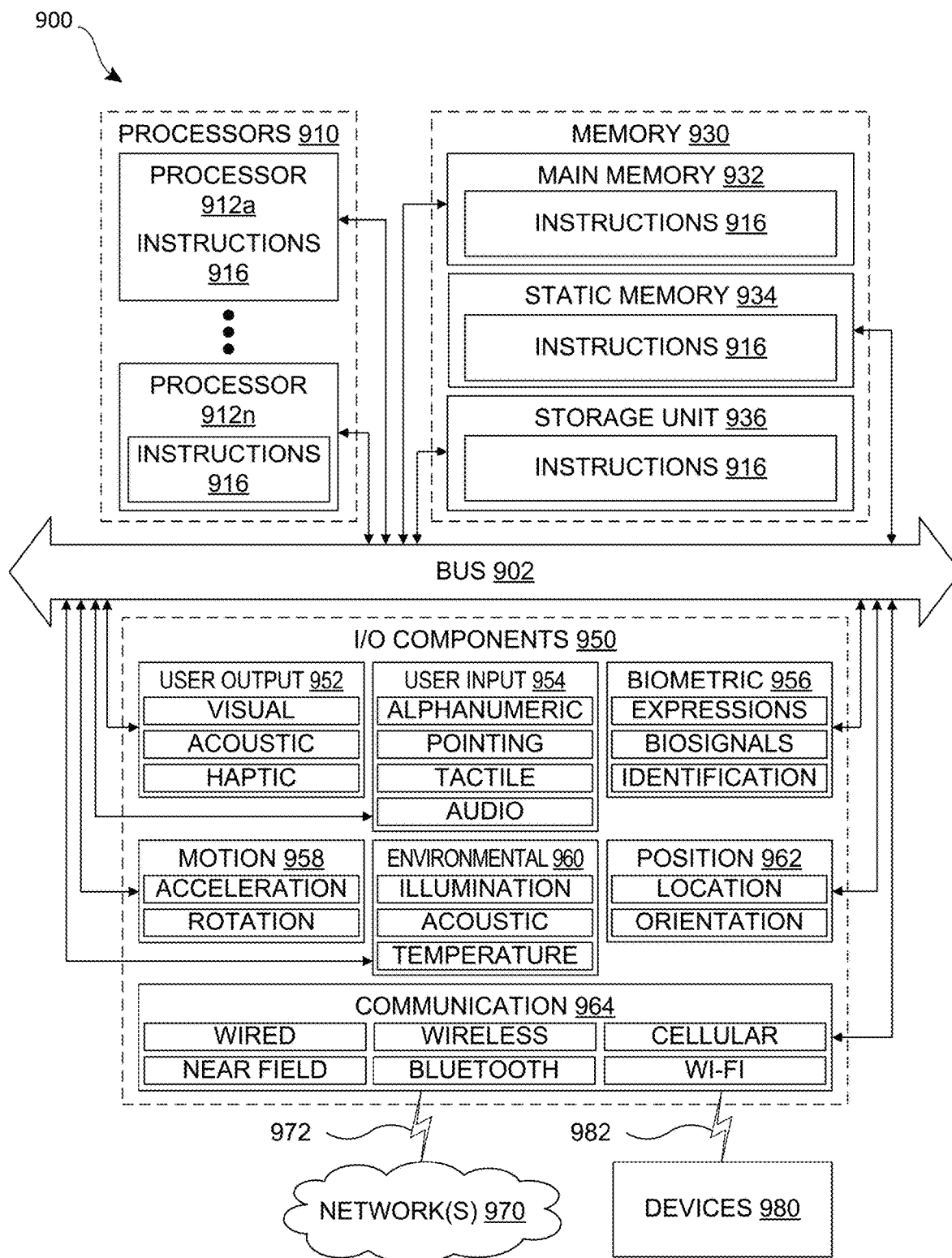
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium storing executable instructions that, when executed, cause the processor to perform operations comprising:
sending a request to a mixed reality service for environment attribute information for a mixed reality environment, the environment attribute information including attributes of the mixed reality environment for displaying the mixed reality service;
receiving the environment attribute information from the mixed reality service;
obtaining, from the mixed reality service, a grayscale background image identified in the environment attribute information;
applying the grayscale background image as a texture to a background object in the mixed reality environment;
determining a background color to be applied to the background object based on the environment attribute information;
applying the background color to the background object to create a color background for the mixed reality environment by setting an albedo value for the background object to the background color to colorize the background object; and
displaying the mixed reality environment on a display of the data processing system.

2. The data processing system of claim 1, wherein the background object comprises a skybox.

3. The data processing system of claim 2, wherein the grayscale background image is segmented into a plurality of segments, and to apply the grayscale background image to the background object the computer-readable medium includes instructions configured to cause the processor to perform an operation of:
applying each of the plurality of segments to a face of the skybox.

4. The data processing system of claim 1, wherein the computer-readable medium includes instructions configured to cause the processor to perform operations of:
receiving a color change indication at the data processing system; and
dynamically setting the albedo value for the background object to the background color to change the background color responsive to receiving the color change indication at the data processing system.

5. The data processing system of claim 4, wherein the computer-readable medium includes instructions configured to cause the processor to perform an operation of:
receiving the color change indication at the data processing system from a color picker user interface element on the data processing system.

6. The data processing system of claim 1, wherein, to display the mixed reality environment, the computer-readable medium includes instructions configured to cause the processor to perform operations of:
rendering a representation of the mixed reality environment using a real time three-dimensional (3D) engine in a web browser on the data processing system; and
displaying the representation of the mixed reality environment in a graphical user interface of the web browser.

7. A method implemented in a data processing system for presenting a mixed reality environment on a display of the data processing system, the method comprising:
sending a request to a mixed reality service for environment attribute information for a mixed reality environment, the environment attribute information including attributes of mixed reality environment for displaying the mixed reality service;
receiving the environment attribute information from the mixed reality service;
obtaining, from the mixed reality service, a grayscale background image identified in the environment attribute information;
applying the grayscale background image as a texture to a background object in the mixed reality environment;
determining a background color to be applied to the background object based on the environment attribute information;
applying the background color to the background object to create a color background for the mixed reality environment by setting an albedo value for the background object to the background color to colorize the background object; and
displaying the mixed reality environment on a display of the data processing system.

8. The method of claim 7, wherein the background object comprises a skybox.

9. The method of claim 8, wherein the grayscale background image is segmented into a plurality of segments, and applying the grayscale background image to the background object further comprises:
applying each of the plurality of segments to a face of the skybox.

10. The method of claim 8, further comprising:
receiving a color change indication at the data processing system; and
dynamically setting the albedo value for the background object to the background color to change the background color responsive to receiving the color change indication at the data processing system.

11. The method of claim 10, further comprising:
receiving the color change indication at the data processing system from a color picker user interface element on the data processing system.

12. The method of claim 7, wherein displaying mixed reality environment further comprises:
rendering a representation of the mixed reality environment using a real time three-dimensional (3D) engine in a web browser on the data processing system; and
displaying the representation of the mixed reality environment in a graphical user interface of the web browser.

13. A non-transitory computer-readable storage medium on which are stored instructions that, when executed, cause a processor of a programmable device to perform functions of:
sending a request to a mixed reality service for environment attribute information for a mixed reality environment, the environment attribute information includes attributes of mixed reality environment for displaying the mixed reality service;

receiving the environment attribute information from the mixed reality service;

obtaining, from the mixed reality service, a grayscale background image identified in the environment attribute information;

applying the grayscale background image as a texture to a background object in the mixed reality environment;

determining a background color to be applied to the background object based on the environment attribute information;

applying the background color to the background object to create a color background for the mixed reality environment by setting an albedo value for the background object to the background color to colorize the background object; and displaying the mixed reality environment on a display of the programmable device.

14. The computer-readable storage medium of claim 13, wherein the background object comprises a skybox.

15. The computer-readable storage medium of claim 14, wherein the grayscale background image is segmented into a plurality of segments, and to apply the grayscale background image to the background object the computer-readable storage medium includes instructions configured to cause the processor to perform operations of:

applying each of the plurality of segments to a face of the skybox.

16. The computer-readable storage medium of claim 13, wherein the computer-readable storage medium includes instructions configured to cause the processor to perform operations of:

receiving a color change indication at the programmable device; and dynamically setting the albedo value for the background object to the background color to change the background color responsive to receiving the color change indication at the programmable device.

17. The computer-readable storage medium of claim 13, wherein to display mixed reality environment the computer-readable storage medium includes instructions configured to cause the processor to perform operations of:

rendering a representation of the mixed reality environment using a real time three-dimensional (3D) engine in a web browser on the programmable device; and displaying the representation of the mixed reality environment in a graphical user interface of the web browser.

* * * * *